April 19, 1932.　　　O. C. TRAVER　　　1,854,965
PROTECTION OF ELECTRIC SYSTEMS
Filed Sept. 29, 1930
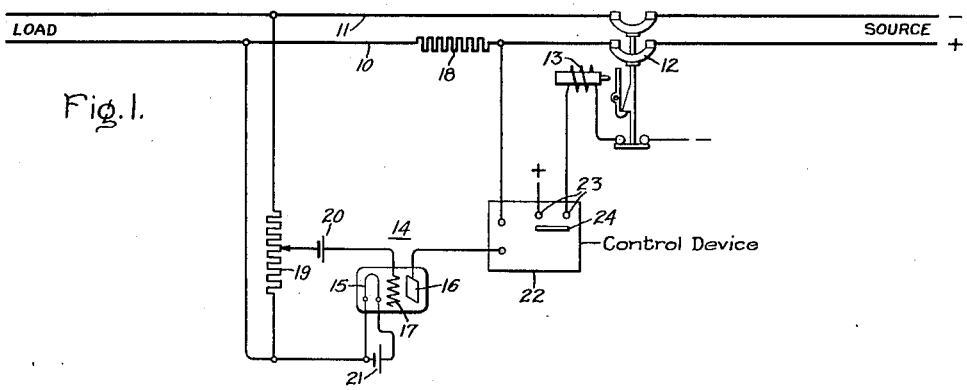
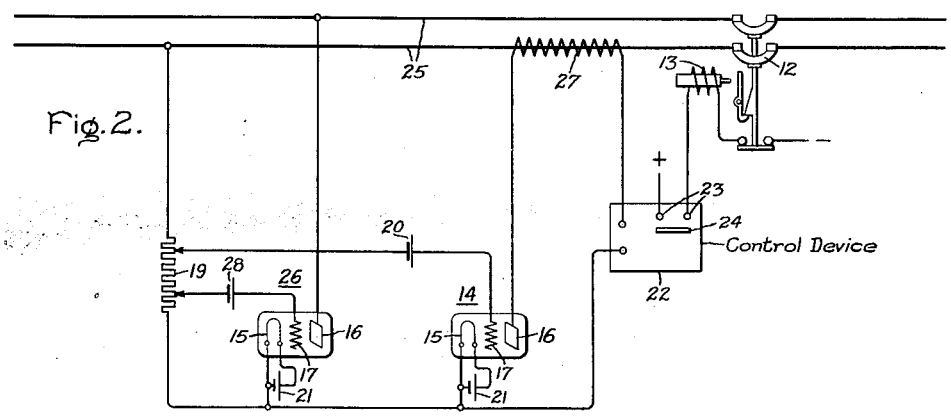
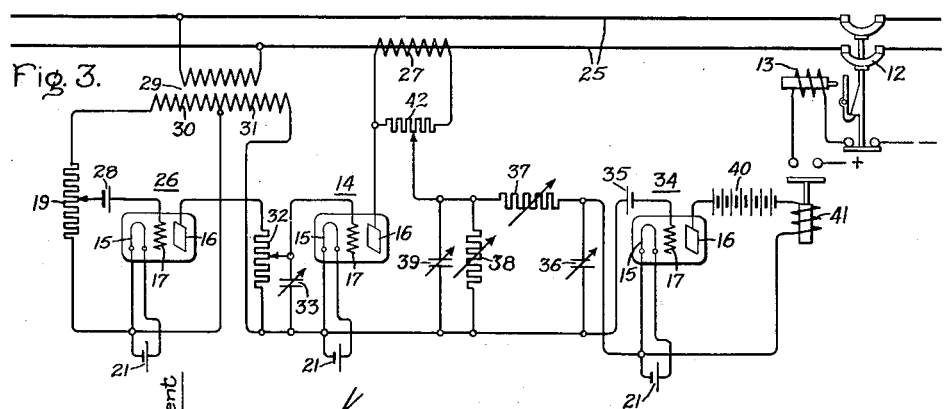
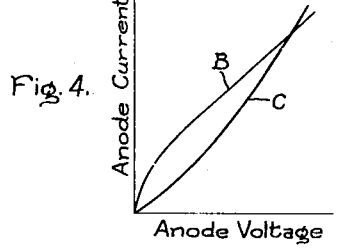
Inventor:
Oliver C. Traver;
by Charles E. Tullar
His Attorney.

Patented Apr. 19, 1932

1,854,965

UNITED STATES PATENT OFFICE

OLIVER C. TRAVER, OF DREXEL HILL, PENNSYLVANIA, ASSIGNOR TO GENERAL ELECTRIC COMPANY, A CORPORATION OF NEW YORK

PROTECTION OF ELECTRIC SYSTEMS

Application filed September 29, 1930. Serial No. 484,961.

My invention relates to improvements in the protection of electric systems and more particularly to improvements in discriminating protective apparatus of the so-called distance type wherein selectivity is obtained on the basis of an ohmic characteristic of the circuit between the fault and the protective apparatus and an object of my invention is to provide an improved protective arrangement whereby to obtain the desired distance selective action with a minimum number of moving parts and a high degree of sensitivity and/or speed.

My invention will be better understood from the following description when considered in connection with the accompanying drawings and its scope will be pointed out in the appended claims.

In the accompanying drawings, Fig. 1 illustrates diagrammatically an embodiment of my invention for the protection of a direct-current circuit, Figs. 2 and 3 illustrate diagrammatically embodiments of my invention for the protection of alternating current circuits, and Fig. 4 illustrates characteristic curves explanatory of a feature of my invention.

In Fig. 1 I have shown for the purpose of illustrating my invention a direct current circuit having conductors 10 and 11. This circuit is arranged to be controlled by suitable circuit interrupting means shown as a latched closed type circuit breaker 12 provided with a trip coil 13. For the purpose of sectionalizing the circuit, other ciruit breakers, not shown, may be provided at desired points of the circuit as is well known to the art.

In accordance with my invention, I control the circuit breakers selectively in dependence on the distance between a fault and a circuit breaker by a fault responsive means of the electric discharge type in order to eliminate the inertia effects of moving parts and to obtain maximum sensitivity and/or speed. As shown in Fig. 1, the electric discharge device is an electric valve 14 of the closed envelope type having a cathode 15, anode 16, and a control electrode 17. Further, in accordance with my invention, I provide for obtaining from the valve 14 an anode current dependent on an ohmic characteristic of the circuit such for example as the resistance, reactance or impedance thereof. For this purpose, there is impressed on the anode 16 a voltage dependent on the circuit current by any suitable means shown as a resistance or shunt 18 connected in series relation with one of the conductors 10 of the circuit to be protected. In other words, the cathode-anode circuit of the valve 14 is connected across the shunt 18. Also there is impressed on the control electrode 17 a normally negative voltage dependent on the circuit voltage by suitable means such as a resistance 19 which is connected across the circuit 10—11. To a point on this resistance 19, I connect the control electrode 17 which may be of the grid type. In other words, the cathode-control electrode circuit is connected across a part or all of the resistance 19. The point of the resistance 19 to which the control electrode 17 is connected can be made adjustable as shown to vary the normal voltage bias on the control electrode and thereby the pick-up of the electroresponsive means. For further control of the circuit of the control electrode 17, I may use any suitable biasing source such as a battery 20 which may be connected to impress a definite voltage on the control electrode. Any suitable source such as a battery 21 may be provided to energize the cathode circuit.

With this arrangement it will be noted that the anode current of the valve 14 will be dependent directly on the circuit current and inversely on the circuit voltage. Consequently, I provide in order to utilize this current to control the circuit 10—11 suitable means such as a control device 22 which can, through its contacts 23, 24, control the circuit of the trip coil 13. The control device 22 may be either instantaneous or time delay and may even be the trip coil 13 of the circuit breaker.

In some cases it may be desirable to control the circuit breaker 12 to obtain a substantially instantaneous opening thereof for faults which occur within a given distance of the circuit breaker and to delay the opening of the circuit breaker for faults beyond this distance. In this case, as is well known to the art, two distance relays may be employed, one substantially instantaneous and the other time delay. My invention is readily adaptable to this arrangement in which case there would be provided two fault responsive means, such as shown in Fig. 1, each arranged to control the circuit of the trip coil 13 but the control device in one case would be substantially instantaneous while in the other case it would be a time delay device, either inverse or definite depending upon the time selectivity desired.

Under normal voltage conditions on the circuit 10—11 the voltage on the control electrode 17 will be such that insufficient current will flow in the anode circuit to effect operation of the control device 22. However, in case of a fault, such as a short-circuit, on the circuit 10—11 the voltage drop in the resistance 19 will be accordingly reduced. Consequently, the negative bias on the control electrode 17 will be proportionately reduced and since the voltage drop across the resistance 18 is increased, due to the flow of fault current, there will occur in the anode circuit a current which varies substantially directly with the circuit current and inversely with the circuit voltage. The control device 22 will, therefore, be energized by a current which depends upon an ohmic characteristic of the circuit such as the resistance, reactance or impedance thereof between the circuit breaker location and the fault so that the circuit breaker 12 will be controlled in accordance with such characteristic.

In the embodiment of my invention shown in Fig. 2 an alternating current circuit or line 25, shown single-phase for simplicity, is arranged to have its circuit breaker 12 controlled by electric discharge means including two electric valves 14 and 26. In this case the anode of the valve 14 has impressed thereon a voltage proportional to the circuit current and is accordingly connected in series relation with the line 25. For this purpose the anode-cathode circuit may be connected across the secondary of a current transformer 27, as shown. This current transformer is preferably a high ratio transformer. The voltage on the control electrode 17 of the valve 14, however, instead of being taken directly from the circuit through the resistance 19 as in Fig. 1, is controlled by the valve 26. The anode-cathode circuit of this valve includes the resistor 19 and is connected to be energized in accordance with the voltage of the line 25 either directly or through a potential transformer where such is necessary.

The anode current of the valve 26 causes a voltage drop in the resistor 19 and this places a negative bias on the control electrode 17 of the valve 14 in opposition to the positive bias of the battery 20. Consequently, as the circuit voltage increases the control electrode 17 of the valve 14 becomes more negative and the anode current of this valve decreases. Thus, under normal voltage conditions the negative bias may be such as to prevent sufficient anode current to operate the control device 22. In case of a fault, the line current will rise thus increasing the anode voltage of the valve 14. At the same time the line voltage drops and the negative bias on the control electrode of the valve 17 decreases. As a result of these two changes the current appearing in the anode-cathode circuit of the valve 14 is dependent substantially directly on the circuit current and inversely on the circuit voltage. When this anode current is sufficient to effect the operation of the control device, it will cause the operation of the circuit breaker 12 unless a circuit breaker elsewhere on the line nearer the fault has operated.

If a substantially pure electron discharge device is used, it may be desirable to modify or alter the so-called three-halves law of such devices in order to obtain a more desirable operating characteristic for example, to obtain more sensitive operation at low voltages or to have operation more nearly proportional to the first power of the voltage. One way in which the anode current-voltage characteristic can be altered is shown in connection with the valve 26 of Fig. 2. The anode current of this valve causes a voltage drop in the resistor 19 which biases the control electrode of the valve in opposition to the plus bias of the battery 28 so that the anode voltage-current characteristic may be varied from that shown by curve C, Fig. 4, to that shown by curve B. It will be noted from curve B, that, when the anode voltages are low, comparatively small changes in voltage produce disproportionately large changes in the anode current but above a given anode voltage the slope of the curve is practically uniform and of such a value that the change in the anode current is substantially directly proportional to the first power of the voltage.

In the embodiment of my invention shown in Fig. 3, the bias on the control electrode 17 of the valve 26 does not depend on the anode current of this valve. Instead I make the control electrode negative bias voltage of this valve proportional to its anode voltage. This may be accomplished by the use of a potential transformer 29 having two secondary windings 30 and 31. The resistance 19 is connected across the secondary 30, while across the secondary 31, I connect the anode circuit of the valve 26. This anode circuit includes a resistor 32 whereby a negative voltage bias proportional to the line voltage is impressed on the control electrode 17 of the valve 14. Since the secondary windings 30 and 31 are on the same transformer, their voltages are proportional and, therefore, the control electrode bias voltage and the plate voltage of the valve 26 are proportional. This provides a very effective way of altering the so-called three-halves law of a substantially pure electron discharge device to obtain an anode voltage-current characteristic such as shown by curve B of Fig. 4.

In order to avoid the effect of power factor on the distance characteristic action of the responsive means, a condenser 33 may be connected across the control electrode resistance 32 as shown. In this way it is possible to hold a continuous negative bias on the control electrode 17 of the valve 14. The anode current of the valve 26 is intended to bias the control electrode 17 of the valve 14 negative but unless the current flows when the anode of the valve 14 is positive, it will have no biasing effect. However, the condenser 33 connected as shown holds the negative voltage bias between successive impulses of the plate current of tube 26.

In the embodiment of my invention shown in Fig. 3, I have illustrated the control device 22 as an inverse time delay means of the electric discharge type. As shown, this time delay control device includes an electric discharge valve 34 arranged to have its control electrode 17 biased positively in opposition to the negative bias of the battery 35 by slowly charging a condenser 36 in the anode circuit of the valve 14, this anode circuit including the series connected leak resistance 37 and the shunt connected resistance 38 and smoothing condenser 39. Thus, the plate current of the valve 34 derived from a suitable source 40 slowly increases and when it reaches a predetermined value operates the relay 41 which controls the circuit of the trip coil 13. Inasmuch as the valve 14 nearest the fault will output the greatest plate current, the valve 34 associated therewith will have its negative bias overcome the quickest so that the relay 41 nearest the fault is actuated first. In order to adjust the time of operation of the fault responsive means, the anode circuit of the valve 14 may be connected across the variable resistance 42 in circuit with the current transformer 27 and the resistors 37 and 38 and also the condensers 36 and 39 may be made adjustable.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. In combination with an electric circuit, means for interrupting said circuit, fault responsive protective means for effecting the opening of said interrupting means on the occurrence of a fault in a time dependent on the distance to the fault including an electric discharge device having a cathode, an anode and a grid, means for obtaining from said device an anode current dependent on an ohmic characteristic of said circuit between a point thereof and the fault including means for impressing on said anode a voltage dependent on the circuit current and means for impressing on said grid a voltage dependent on the circuit voltage, and inverse time delay means connected to be energized in accordance with the anode current of the device for effecting the opening of said interrupting means in a time dependent on the distance between said point and the fault.

2. In combination with an electric circuit, means for interrupting said circuit, fault responsive protective means for effecting the opening of said circuit interrupting means on the occurrence of a fault in accordance with the distance to the fault including an electric valve having a cathode, an anode and a control electrode, means for obtaining from said valve an anode current dependent on an ohmic characteristic of said circuit between a point thereof and the fault and means connected to be controlled in accordance with the anode current of said valve for effecting the opening of said interrupting means in accordance with the distance to the fault.

3. In combination with an electric circuit, means for interrupting said circuit, fault responsive protective means for effecting the operation of said interrupting means on the occurrence of a fault in a time dependent on the distance to the fault including a substantially pure electron discharge device having a cathode, an anode and a grid, means for obtaining from said device an anode current dependent on an ohmic characteristic of the circuit between a point thereof and the fault including means for impressing on said anode a voltage dependent on the circuit current, means for impressing on said grid a voltage dependent on the circuit voltage and means for modifying the anode current-anode voltage characteristic of the device to provide an anode current approximately inversely proportional to the first power of the circuit voltage, and inverse time delay means connected to be controlled in accordance with the anode current of the device for effecting the opening of said interrupting means in a time dependent on the distance between said point and the fault.

4. In combination with an electric circuit, means for interrupting said circuit, fault responsive protective means for effecting the opening of said interrupting means including an electric valve having a cathode, an anode and a control electrode, means connected to said anode and said control electrode and to said circuit to be energized therefrom for obtaining from said valve an anode current which varies substantially directly with the circuit current and inversely with the circuit voltage, and control means connected to be controlled in accordance with the anode current of the valve for effecting the opening of said interrupting means when a predetermined relation exists between the circuit current and voltage.

5. In combination with an electric circuit, means for interrupting said circuit, fault responsive protective means for effecting the opening of said circuit interrupting means including a substantially pure electron discharge device having an anode, a cathode and a control electrode, means connected to said anode and said control electrode and to said circuit to be energized therefrom for obtaining from said device an anode current which varies substantially directly with the circuit current and inversely with the first power of the circuit voltage, and time delay means connected to be controlled in accordance with the anode current of the valve for effecting the opening of said interrupting means in a time dependent on the ratio of the circuit voltage to the circuit current.

6. In combination with an electric circuit, means for interrupting said circuit, fault responsive protective means for effecting the opening of said circuit in a time dependent on the distance to a fault, including an electric valve having a cathode, an anode and a control electrode, means for obtaining from said valve an anode current dependent on an ohmic characteristic of said circuit between a point thereof and the fault including means for impressing on said anode a voltage dependent on the circuit current and means for impressing on said control electrode a voltage dependent on the circuit voltage, and time delay means connected to be controlled in accordance with the anode current of the valve for effecting the opening of said interrupting means in a time dependent on the distance between said point and the fault.

In witness whereof I have hereunto set my hand this 26th day of September, 1930.

OLIVER C. TRAVER.